May 30, 1972 SHINTARO OSHIMA ET AL 3,666,635

METHOD FOR FABRICATING A MEMORY STRIP ARRAY

Filed April 13, 1970 4 Sheets-Sheet 2

METHOD FOR FABRICATING A MEMORY STRIP ARRAY

Filed April 13, 1970 4 Sheets-Sheet 4

United States Patent Office 3,666,635
Patented May 30, 1972

3,666,635

METHOD FOR FABRICATING A MEMORY STRIP ARRAY

Shintaro Oshima and Toshihiko Kobayashi, Tokyo, Tetsusaburo Kamibayashi, Niza-machi, Akira Okada and Yoshihisa Komazawa, Tokyo, and Keigo Komuro, Ebina-machi, Japan, assignors to Kokusai Denshin Denwa Kabushiki Kaisha, Tokyo-to, Japan Filed Apr. 13, 1970, Ser. No. 27,680
Claims priority, application Japan, Apr. 18, 1969, 44/29,649; May 30, 1969, 44/41,660
Int. Cl. C23b *5/48;* C23f *17/00*
U.S. Cl. 204—15 3 Claims

ABSTRACT OF THE DISCLOSURE

A method for fabricating a memory strip array, provided with a number of parallel memory strips, on a smooth surface of an insulative substratum, which a first ferromagnetic thin film and a conductive thin film are successively deposited in a superposed relationship on the smooth surface so as to obtain a composite layer; the composite layer is then etched in a chemical photo-etching process and an electrolytic-etching process to produce parallel strips of the composite layer, the respective ends of which are jointed respectively together to end lines of the composite layer; a second ferromagnetic thin film is electroplated, by the use of the end lines as an electrode, on each of the parallel strips so as to produce the parallel memory strips each having a closed magnetic circuit around a conductive thin film-strip by the first ferromagnetic thin film and the second ferromagnetic thin film; and the parallel memory strips are separated at necessary parts of said end lines so as to obtain parallel memory strips separated in a desired pattern.

This invention relates to a method for fabricating a memory strip array and more particularly to methods for fabricating memory strip arrays each of which comprises a number of composite strips of ferromagnetic thin film and of conductive thin film deposited on a substratum in a parallel arrangement.

Many kinds of memory devices have been heretofore proposed to raise the operation speed, to miniaturize the size, to realize the high memory capacity, and to reduce the power consumption for such memory devices and further to fabricate them at a low cost.

One of such memory devices is a wire-memory device which comprises a set of row magnetic wires and a set of column conductive wires arranged orthogonally to the row magnetic wires in a woven state. Each of the magnetic wires is usually composed of a conductive spring wire and a ferromagnetic thin film electroplated uniformly on the conductive spring wire. The memory cells are installed at the intersections between the row magnetic wires and the column conductive wires. The row magnetic wires are usually employed as digit lines, while the column conductive wires are employed as drive lines. Since the ferromagnetic thin film is directly plated on the conductive spring wire of the digit line in this wire memory device, so as to form a closed magnetic circuit with respect to magnetic fluxes caused by a current flowing through the digit line, an output signal having a high signal-to-noise ratio can be obtained. Moreover, since a memory device is merely produced by weaving the column conductive wires with the row magnetic wires in a narrow regular space, a relatively high bit density can be readily realized.

Another of such memory devices comprises a set of row magnetic strips and a set of column conductive strips arranged orthogonally close to but insulated from the row magnetic strips, while the row magnetic strips and the column conductive strips are deposited on a substratum. The memory cells are installed at the intersections between the row magnetic strips and the column conductive strips. This memory device has such advantages that a ferromagnetic thin film having a better magnetic characteristic than the former device can be readily produced and that a higher operation speed than the former device can be readily obtained. However, each of the row magnetic strips comprises a first ferromagnetic thin film deposited on the surface of the substratum, a conductive layer on the first ferromagnetic thin film, an insulative layer on the conductive layer and a second ferromagnetic thin film on the insulative layer. Accordingly, since the first ferromagnetic thin film and the second ferromagnetic thin film do not form a closed magnetic circuit around the conductive layer with respect to magnetic fluxes caused by a current flowing through the conductive layer, an output voltage obtained from this memory device is relatively small.

The above-mentioned memory devices have further disadvantages for high bit density in the miniaturized size as follows. In the former memory device, if the diameter of the magnetic wire becomes smaller to raise the bit density, tensile strength of the magnetic wire becomes also smaller so that uniform and continuous coating of the ferromagnetic thin film becomes very difficult. Moreover, even if the above-mentioned uniform coating of the ferromagnetic thin film can be realized, the magnetic characteristic of the magnetic thin film will necessarily be affected by only a small stress caused in fabricating the memory device. In the later memory device, the composite magnetic strips are produced by an evaporative deposition method in which the precise matching of a pattern mask on the fabricated strips must be performed at every deposition operation for each of the superposed layers of the composite strips. In this case, the evaporated material is readily deposited at parts positioned under the pattern mask if the width of each line of the pattern mask becomes narrow to raise the bit density. Moreover, the precise matching of the pattern mask becomes more difficult in accordance with an increase of the bit density since matching of the pattern mask must be stably maintained at a high temperature for the evaporative deposition. As mentioned above, increase of the bit density is limited in each of the memory devices. Moreover, the output voltage of the memory device of the latter type becomes very small due to the demagnetizing force which increases in accordance with the decrease of the width of the magnetic strips. Accordingly, if amplifiers necessary to amplify the small output voltages must be provided, the cost of memory device will become high.

An object of this invention is to provide a method for fabricating a memory strip array, having a number of composite memory strips of ferromagnetic thin film and of conductive thin film deposited on a substratum in a parallel arrangement, and suitable to produce, at a low cost and in a process line of mass production, an extremely miniaturized matrix memory device of high bit density operable at a high operation speed and in a low power consumption.

To attain said object and other objects of this invention, a first ferromagnetic thin film and a conductive thin film are successively deposited in order by a deposition technique on the smooth surface of an insulative substratum so as to obtain a double-composite layer. In accordance with the feature of this invention, the double-composite layer is etched to produce parallel strips of the double-composite layer, respective ends of which are jointed respectively together to end lines of the double-composite layer. Thereafter, a second ferromagnetic thin film is electroplated, by the use of at least one of said end lines as an electrode, on each of the parallel strips so as to produce parallel memory strips. Each of these parallel memory strips has a closed magnetic circuit around the conductive thin film-strip by the first ferromagnetic thin film and the second ferromagnetic thin film. Finally, said parallel memory strips are separated at necessary parts of said end lines by an etching technique so as to obtain parallel memory strips separated in a desired pattern.

If the above-mentioned etching of the double-composite layer for producing parallel strips of the double-composite layer comprises a first chemical-etching process and a second electrolytic-etching process, two side faces of each of the parallel strips of the double-composite layer are etched so as to obtain extremely smooth surfaces. Accordingly, a good magnetic characteristic is obtained with respect to each of the closed magnetic circuits when the second ferromagnetic thin film is electroplated on each of the parallel strips so as to form the closed magnetic circuit together with the first ferromagnetic thin film-strip.

In accordance with another feature of this invention, a third ferromagnetic thin film may be deposited on the conductive thin film before the electroplating of the second ferromagnetic thin film, so that a triple-composite layer is produced on the smooth surface of the insulative substratum. Accordingly, each of the above-mentioned parallel strips comprises the first ferromagnetic thin film-strip, the conductive film-strip and the third ferromagnetic thin film-strip which are successively deposited in order on the smooth surface of the insulative substratum. Each of the parallel memory strips is produced by electroplating the second ferromagnetic thin film on each of the parallel strips having the third ferromagnetic thin film. This additional deposition of the third ferromagnetic thin film is effective to improve the magnetic characteristic of the second ferromagnetic thin film deposited on this third ferromagnetic thin film.

The principle and merits of the method of this invention will be better understood from the following more detailed discussion in conjunction with the accompanying drawings, in which the same or equivalent parts are designated by the same reference numerals, characters and symbols, and in which.

Figure 1A:
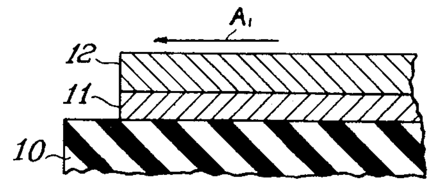
FIGS. 1A, 1B and 1C are fragmental sectional views explanatory of steps of a method of this invention.

With reference to FIGS. 1A to 1E and 2C, substantial steps in a method of this invention will first be described. At first, a first ferromagnetic thin film 11 is deposited by evaporative deposition on an entire smooth surface of a glass substratum 10 in a direct-current magnetic field applied in the direction of an arrow $A_1$. A conductive thin film 12, such as copper, is then deposited on the entire surface of the first ferromagnetic thin film 11, as for example by evaporative deposition. Thus, as a result of these deposition steps, this process of evaporative deposition, a double-composite layer of the first ferromagnetic thin film 11 having an easy magnetization direction along the arrow $A_1$ and of the conductive film 12 as shown in FIG. 1*a* is obtained on the insulative substratum 10.

Figure 1B:
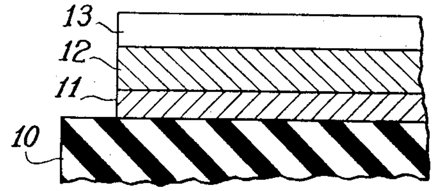
Figure 1C:
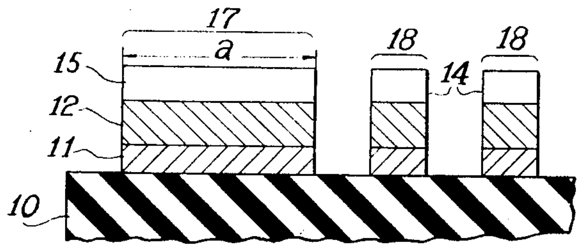
Figure 1D:
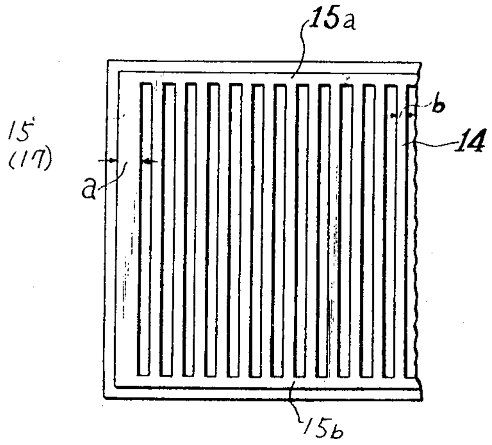
FIGS. 1D and 1E are fragmental plane views explanatory of steps of a method of this invention.

Next, an etching-resistive, photo-sensitive material 13, such as "KPR," is applied on the entire surface of the conductive thin film 12 as shown in FIG. 1B. This material 13 is exposed under a desired pattern mask, developed and arranged so that inner parallel strips 14 and outer strips 15, 15*a* and 15*b* (and 15*c* not shown) are remained on the surface of the copper layer 12 as shown in FIGS. 1C and 1D. In hte case, each of the outer strips 15, 15*a*, 15*b* and 15*c* (not shown) is designed so as to have a sufficient width *a* necessary for the following etching process, and the respective two ends of the inner parallel strips 14 are respectively jointed to the outer strips 15*a* and 15*b* as shown in FIG. 1D. Thereafter, the double-composite layer (11, 12) is etched in accordance with the fixed pattern of the material 13 as shown in FIGS. 1C and 1D. Accordingly, parallel strips 18 (and 17) of the double-composite layer are produced on the glass substratum 10 so that respective ends of the parallel strips 18 are jointed respectively together to outer end lines 15*a* and 15*b* of double-composite layer (11, 12). The width of each of the parallel strips 14 has a value of $50\mu$ by way of example. However, this width is relatively widened for ready illustration. The material 13 is eliminated after completion of the above mentioned photo-etching techniques. This etching process will be further described in detail with reference to FIGS. 2A to 2C.

Figure 2A:
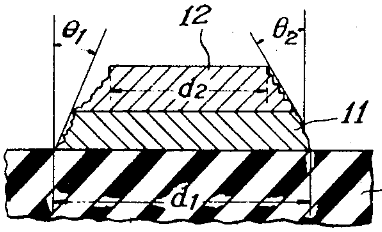
FIGS. 2A, 2B and 2C are a fragmental sectional view and fragmental perspective views explantory of another feature of this invention.
Figure 2B:
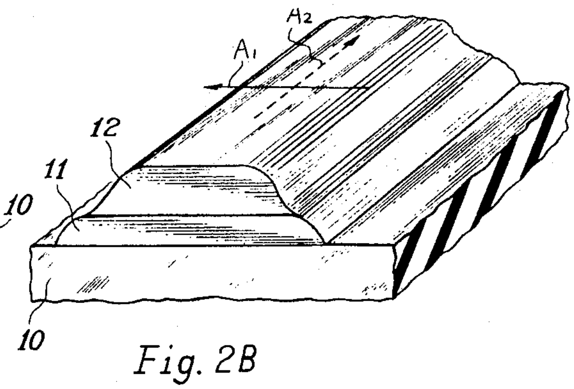
Figure 2C:
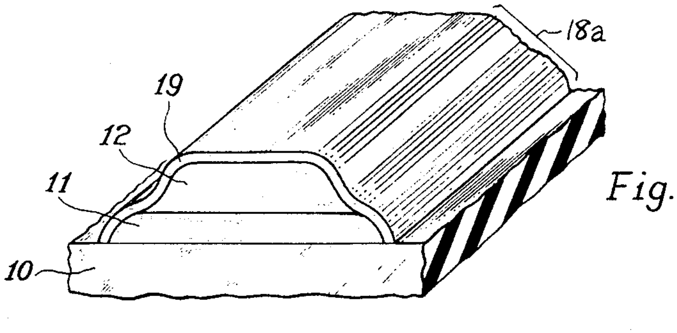

Thereafter, a second ferromagnetic thin film 19 is electrically plated, by the use of at least one of said end lines 15*a* and 15*b* as an electrode, on the conductive thin film-strip 12 of each of the parallel strips 18 in a direct current magnetic field substantially orthogonal to the parallel strips 18 so as to produce parallel memory strips 18*a* (shown in FIG. 2C). Each of these parallel memory strips 18*a* has a closed magnetic circuit around the conductive thin film-strip 12 by the first ferromagnetic thin film 11 and the second ferromagnetic thin film 19 as shown in FIG. 2C. The closed magnetic circuit is oriented in the circumference direction of the conductive thin film-strips 12. In this case, since respective two ends of the inner parallel strips 18 are jointed respectively to the outer end lines 15*a* and 15*b*, the application of a necessary electric potential to the whole part of the parallel-shaped pattern of the conductive thin film 12 can be readily performed by the use of at least one of the outer end lines 15*a* and 15*b* as a connection terminal connected to an electrode of the electric plating apparatus. Therefore, "edge effect" at the electrical plating can be substantially eliminated. Moreover, if the necessary electric potential is applied to both the outer end lines 15*a* and 15*b*, inclination of the electric potential caused by the resistance of the strips becomes uniform. Accordingly, the second ferromagnetic thin film 19 having a uniform thickness and a uniform magnetic characteristic can be plated to each of the parallel strips 18 (and 17).

Figure 1E:
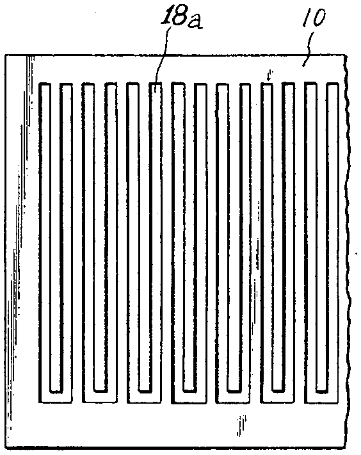

Finally, the above-mentioned parallel memory strips 18*a* are separated at necessary parts of the outer end lines 15*a* and 15*b* by eliminating the outer lines 15 and 15*a* and necessary parts of the end line 15*b* in accordance with a photo-etching technique so as to obtain parallel memory strips 18*a* separated in a desired pattern as shown in FIG. 1E. This pattern of the separated parallel memory strips shown in FIG. 1E is suitable to form a matrix memory device in which each two intersections between the parallel memory strips 18*a* and a set of colum conductive strips (not shown) arranged orthogonally and closely but insulatively to the parallel memory strips 18*a* are used to form each memory cell, since each of the parallel memory strips 18*a* comprises a turn-up strip. However, each of the separated memory strips 18*a* may comprise a single strip. In this case, each of memory cell of the matrix memory device is installed at a respective intersection between these separate memory strips 18*a* and the set of column conductors (not shown), while the return line for each of the separated memory strips 18*a* is necessarily provided.

The above-mentioned etching step will be further described in detail below with reference to FIGS. 2A to 2C. In the etching step, there are two methods involved. One of the two methods is a chemical etching in which etching is performed in a chemical solution without any electric field. The other of the two methods is an electrolytic-etching in which etching is performed in an electrolyte under an electric field. In a usual photo-etching process, the former chemical etching technique is employed. However, the above-mentioned two methods of etching are effectively combined in accordance with this invention to obtain a good result.

If the etching step of the method of this invention is performed only by chemical etching, the side faces of the first ferromagnetic thin film-strip 11 and the conductive thin film strips 12 become rough in a microaspect as shown in FIG. 2A. Accordingly, it is very difficult to perform uniformly the electroplating of the second ferromagnetic thin film 19 on the strip 18 so as to obtain a good magnetic characteristic. This is understood from observation by an electron microscope. In this case, however, it is remarkable that the conductive thin film 12 of copper has a higher etching speed in comparison with the first ferromagnetic thin film 11 of permalloy. Accordingly, even if the side faces of the strips 11 and 12 become rough in the microaspect, respective average inclinations $\theta_1$ and $\theta_2$ of the side faces of the strips 11 and 12 have a relation $\theta_1<\theta_2$. Therefore, the width $d_1$ of the strip 11 is larger than the width $d_2$ of the strip 12. To make the rough side aspect of the film-strips 11 and 12 smooth, the electrolytic-etching is performed under an electric field after the above-mentioned chemical-etching in accordance with the feature of this invention. Since a greater part of the electrolytic current in this electrolytic-etching is distributed to projected portions of the rough side faces, these rough side faces of the film-strips 11 and 12 become smooth as shown in FIG. 2B. In this case, the width $d_1$ of the film-strip 11 is wider than the width $d_2$ of the film-strip 12.

In this case, the established easy magnetization direction $A_1$ of the first ferromagnetic thin film-strip 11 is liable to be directed to a direction $A_2$ due to the demagnetizing force which is increased in accordance with reduction (miniaturization) of the width $d_1$ of the ferromagnetic thin film-strip 11. However, since the second ferromagnetic thin film 19 is electically plated on the films 12 and 11 as shown in FIG. 2C by the use of the film-strips 11 and 12 as an electrode of this electrical plating, the easy magnetization direction of the first ferromagnetic thin film 11 is maintained along the direction $A_1$ in a closed magnetic circuit, which is formed by the first and second ferromagnetic thin film strips 11 and 19 intimately connected in series to each other around the conductive thin film-strip 12. The relationship $d_1>d_2$ is useful to form the above-mentioned closed magnetic circuit.

Figure 3A:
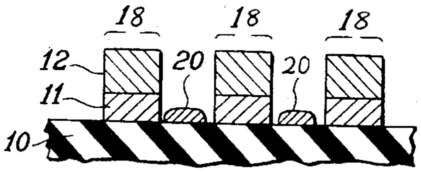
FIGS. 3A and 3B are respectively a fragmental sectional view and a fragmental plane view explanatory of another feature of this invention.
Figure 3B:
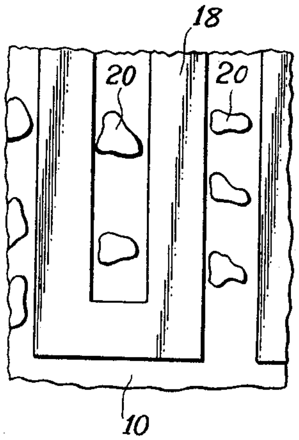

If the etching process is performed only by electrolytic-etching insular blocks of films 20 are left between adjacent parallel strips 18 as shown in FIGS. 3A and 3B. This is caused by the insulation of the electrolyte-current due to the insular blocks of films 20 which are produced on account of a non-uniform etching at the last course of the electrolytic-etching. These insular blocks of films 20 cause noise in a matrix memory device using the memory strip array fabricated by the method of this invention. Accordingly, it will be understood that the object of the etching step in the method of this invention cannot be attained by the electrolytic-etching only. In other words, the chemical etching and the electrolyte etching must be performed in this order.

Figure 4:
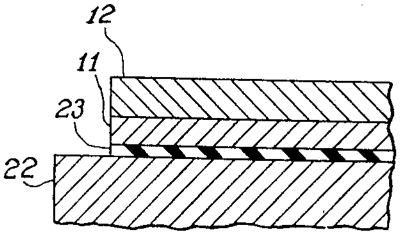
FIG. 4 is a fragmental sectional view explanatory of another feature of this invention.

In the above disclosure, it is assumed that the insulative substratum 10 is a glass substratum. However, the insulative substratum 10 having the smooth surface may be a conductive substratum 22 on which an insulative and smooth layer 23, such as silicon oxide (SiO), is deposited as shown in FIG. 4.

As a result of our test, we have shown that the composition of an alloy of a ferromagnetic thin film electroplated on a different metal is different from a desired composition at the initial thin part of the plated ferromagnetic thin film. If the permalloy thin film having a composition (Fe: 20%; Ni: 80%) is plated on copper, by way of example, the permalloy thin film is initially plated so as to have a larger component of Fe while the permalloy thin film is plated at the desired component after exceeding a threshold thickness (e.g., 1000 A.). If the composition of the ferromagnetic thin film deviates in the direction of the thickness of the film, the magnetic characteristic of this ferromagnetic thin film will also deviate so that the revolution of magnetization in the plane of the ferromagnetic thin film becomes non-uniform. Accordingly, the output voltage generated to the coupled conductor in accordance with this revolution of magnetization is reduced, and the memory contents are liable to be destroyed by external disturbing magnetic fields.

Figure 5A:
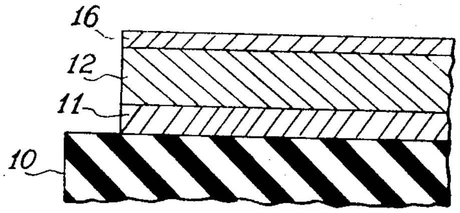
FIGS. 5A, 5B, 5C and 5D are fragmental sectional views and fragmental perspective views explanatory of another feature of this invention.
Figure 5B:
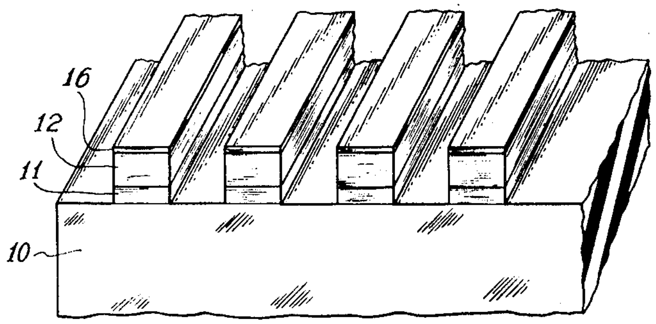
Figure 5C:
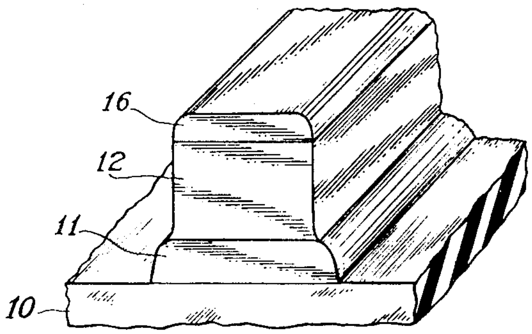
Figure 5D:
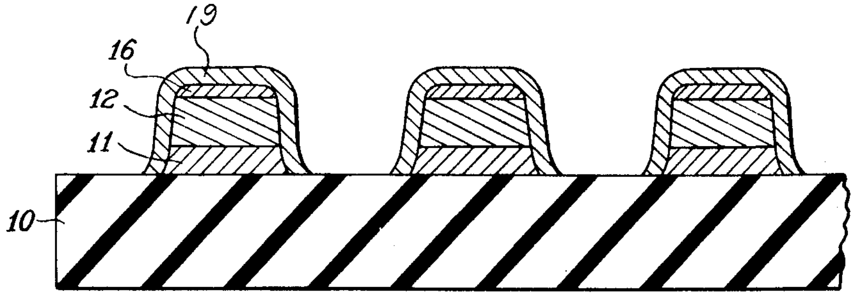

To avoid the above-mentioned defect of the electroplating step, a third ferromagnetic thin film 16 is deposited on the entire surface of the conductive film 12 by evaporative deposition as shown in FIG. 5A. In this case, the composition of the third ferromagnetic thin film 16 is determined so as to be suitable to the desired composition of the second ferromagnetic thin film 19 which is to be deposited on the third ferromagnetic thin film 16. The succeeding steps are performed as shown in FIGS. 5B, 5C and 5D as understood on reference to the above-mentioned steps described with reference to FIGS. 1A to 1E and 2C. Accordingly, the photo-etching is performed for the triple-composite layer (11, 12, 16) as shown in FIGS. 5B and 5C, and the second ferromagnetic thin film 19 is electrically plated on the triple-composite film-strip (11, 12, 16) as shown in FIG. 5D. In this electroplating, since the third ferromagnetic thin film 16 having the desired composition is previously deposited on the conductive film 12, the second ferromagnetic thin film 19 is electroplated from the initial deposition course so as to have the desired composition.

Figure 6A:
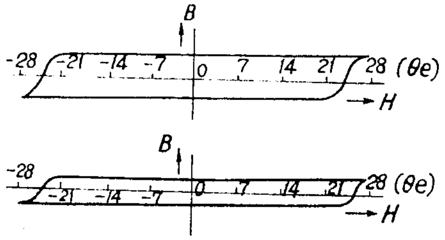
FIGS. 6A and 6B are characteristic curves explanatory of the characteristics of memory strip arrays produced in accordance with this invention.
Figure 6B:
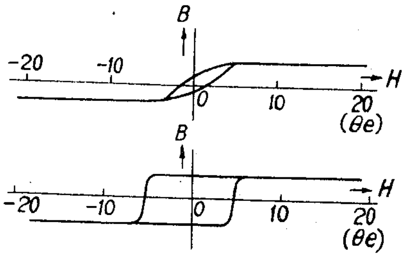

With reference to FIGS. 6A and 6B, the effective merits of the third ferromagnetic thin film 16 will be described. In each of FIGS. 6A and 6B, the upper portion thereof shows a magnetic characteristic along the hard magnetization direction of the first and second ferromagnetic thin films 11 and 19 each having a thickness 1500 A. while the lower portion shows a magnetic characteristic along the easy magnetization direction of the same film, each having the same thickness 1500 A. As understood from FIG. 6A, the coercive force of the magnetic circuit formed by the first and second ferromagnetic thin films (11 and 19) has a substantially constant value 25 oe. at two directions if the third ferromagnetic thin film 16 is not provided. In this case of thickness 1500 A., this memory strip (18) is not suitable for memory storage means due to a lack of anisotropy. However, if the third ferromagnetic thin film 16 is deposited before plating of the second ferromagnetic thin film 19, the closed magnetic circuit formed by the first, second and third ferromagnetic thin films (11, 16, 19) has a sufficient rectangular hysteresis characteristic showing anisotropy at this thickness 1500 A.

Other test results are obtained as follows for samples I and II, in each of which the thicknesses of the ferromagnetic thin films (11 and 19) and the copper film 12 have respectively values 2000 A. and 5000 A. and the width of the strip is the same value 50$\mu$. Moreover, the sample II has the third ferromagnetic thin film 16 having a thickness 300 A. In these conditions, the sample I generates an output voltage 4 milli-volts for a digit current of 20 milli-amperes and a word current of 500 milli-amperes having a rise time of 20 nano-seconds, while the sample II generates 8 milli-volts for the same direct currents. The merits for providing the third ferromagnetic thin film 16 before the plating of the second ferromagnetic thin film 19 are clear from these results.

What we claim is:

1. A method for fabricating a memory strip array, comprising the successive steps of:

depositing a first ferromagnetic thin film in a direct current magnetic field on a smooth surface of an insulative substratum, and depositing a conductive thin film over said first ferromagnetic thin film so as to obtain a composite layer, etching the composite layer to produce longitudinal parrallel strips thereof, wherein the strips extend substantially orthogonal to said magnetic field, and wherein the respective ends of the strips are joined respectively to a traverse end line of the composite layer, electroplating, in a direct current magnetic field substantially orthogonal to said strips and by the use of said end line as an electrode, a second ferromagnetic thin film on each of the parallel strips so as to produce parallel memory strips each having a closed magnetic circuit around the conductive thin film-strip, wherein the closed circuit is defined by the first ferromagnetic thin film and the second ferromagnetic thin film intimately connected to each other along the longitudinal sides of said strips, and removing said end line at least between alternate strips of said parallel memory array.

2. A method for fabricating a memory strip array according to claim 1, in which the said etching step comprises a first chemical etching process to produce parallel strips of the composite layer, each strip being joined at one end thereof to said end line of said composite layer, and a second electrolytic etching process to make smooth the longitudinal side faces of the parallel strips.

3. A method for fabricating a memory strip array according to claim 2, further comprising the step of depositing a third ferromagnetic thin film over the conductive thin film so as to obtain a triple-composite layer, wherein the composition of the third ferromagnetic thin film is chosen to provide a desired composite with the second ferromagnetic thin film plated on said third thin film in accordance with the plating step.

References Cited

UNITED STATES PATENTS

| | | | |
|---|---|---|---|
| 3,347,703 | 10/1967 | Engelman et al. | 204—38 |
| 1,919,078 | 4/1909 | Ribbe | 204—38 |
| 3,556,951 | 1/1971 | Cerniglia et al. | 204—38 |
| 3,314,869 | 4/1967 | Dobbin et al. | 204—15 |

JOHN H. MACK, Primary Examiner
R. L. ANDREWS, Assistant Examiner

U.S. Cl. X.R.

117—239; 204—38 B, 143